United States Patent
Leidig

(10) Patent No.: US 9,052,026 B2
(45) Date of Patent: Jun. 9, 2015

(54) SEALING SYSTEM FOR A SOLENOID VALVE AND SOLENOID VALVE

(71) Applicant: BUERKERT WERKE GMBH, Ingelfingen (DE)

(72) Inventor: Albert Leidig, Ilshofen (DE)

(73) Assignee: Buerkert Werke GMBH, Ingelfingen (DE)

( * ) Notice: Subject to any disclaimer, the term of this patent is extended or adjusted under 35 U.S.C. 154(b) by 12 days.

(21) Appl. No.: 14/038,087

(22) Filed: Sep. 26, 2013

(65) Prior Publication Data

US 2014/0091243 A1  Apr. 3, 2014

(30) Foreign Application Priority Data

Sep. 28, 2012 (DE) .................... 20 2012 009 368 U

(51) Int. Cl.
| | |
|---|---|
| *F16K 31/10* | (2006.01) |
| *F16K 25/00* | (2006.01) |
| *F16K 31/06* | (2006.01) |
| *F16K 25/04* | (2006.01) |

(52) U.S. Cl.
CPC ........... *F16K 25/005* (2013.01); *F16K 31/0658* (2013.01); *F16K 31/10* (2013.01); *F16K 25/04* (2013.01); *F16K 31/0655* (2013.01)

(58) Field of Classification Search
CPC ... F16K 25/005; F16K 31/0655; F16K 25/04; F16K 31/10; F16K 31/0658
USPC ........ 251/83, 129.19, 48, 50, 129.07, 129.15, 251/85; 335/257
See application file for complete search history.

(56) References Cited

U.S. PATENT DOCUMENTS

| | | | | |
|---|---|---|---|---|
| 2,735,644 | A * | 2/1956 | Bishofberger | 251/77 |
| 3,292,895 | A * | 12/1966 | Leger et al. | 251/83 |
| 3,295,079 | A * | 12/1966 | Brown | 251/129.19 |
| 3,827,672 | A * | 8/1974 | Stampfli | 251/129.19 |
| 5,232,196 | A * | 8/1993 | Hutchings et al. | 251/129.08 |
| 5,265,841 | A * | 11/1993 | Abrahamsen et al. | 251/75 |
| 5,553,829 | A * | 9/1996 | Hemsen | 251/129.21 |
| 5,992,822 | A * | 11/1999 | Nakao et al. | 251/129.15 |
| 6,047,718 | A * | 4/2000 | Konsky et al. | 137/1 |
| 6,974,117 | B2 | 12/2005 | Dzialakiewicz et al. | |
| 7,055,798 | B2 * | 6/2006 | Ogawa | 251/129.19 |
| 7,163,188 | B1 * | 1/2007 | Sisk | 251/129.19 |
| 7,828,265 | B2 | 11/2010 | Sisk et al. | |
| 2008/0042086 | A1 * | 2/2008 | Sisk et al. | 251/129.02 |
| 2008/0308761 | A1 * | 12/2008 | Matsumoto | 251/129.22 |

FOREIGN PATENT DOCUMENTS

DE  102005019312 A1  11/2006

* cited by examiner

*Primary Examiner* — John Bastianelli
(74) *Attorney, Agent, or Firm* — McNees Wallace & Nurick LLC

(57) ABSTRACT

A sealing system for a solenoid valve is provided for accommodation in a recess in an actuating element movable by a coil. The recess proceeds from an end face of the actuating element close to a valve seat. The actuating element is movably mounted in a solenoid valve and designed to clear or close the valve seat (30). A sealing disk and a spring element biasing the sealing disk are provided, wherein the spring element is arranged on the end face facing away from the valve seat centered with respect to the sealing disk and exerts a force on the sealing disk in direction of the valve seat. The sealing disk is axially shiftably guided in the actuating element. A solenoid valve itself includes such sealing system.

15 Claims, 3 Drawing Sheets

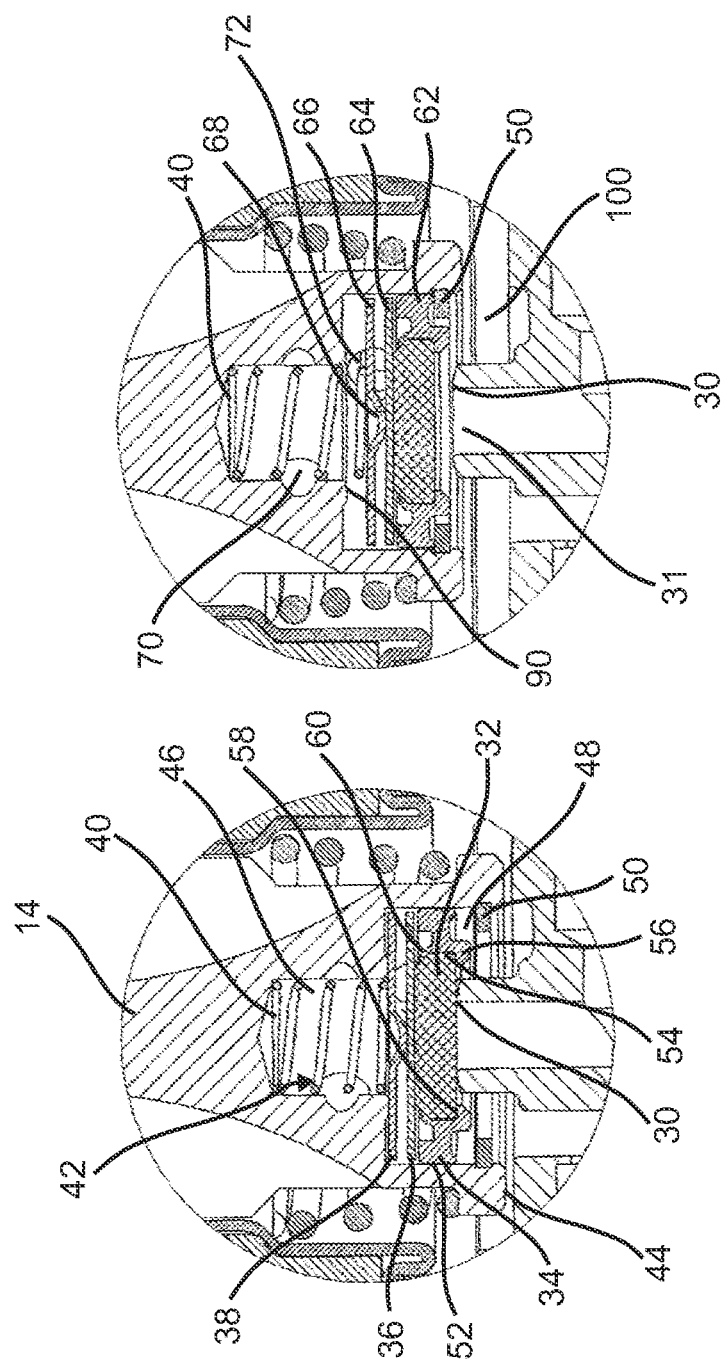

SEALING SYSTEM FOR A SOLENOID VALVE AND SOLENOID VALVE

FIELD OF THE INVENTION

This invention relates to a sealing system for a solenoid valve. In addition, this invention relates to a solenoid valve.

The sealing system according to the invention in particular is provided for the use of high-viscosity oil in oil burners.

BACKGROUND

Solenoid valves which are used for dosing oil for oil burners are subject to high requirements. Usual conditions are a medium pressure in the range of 30 bar, coil temperatures of about 165° C. for oils with a viscosity of about 75 cst.

At pressures of 30 bar, no media-separated valves with diaphragms can be used. This means that the valve space in which a magnet core is moved on switching the valve is filled with medium and the magnet core as well as the sealing system is surrounded by oil. During the switching operation, when the magnet core is attracted, the same must displace the oil from the valve space. High-viscosity media, however, make moving the magnet core more difficult, and the movement is braked.

In these valves for use with high-viscosity media it is problematic in addition that the seal at the moment of attraction, i.e. when it actually should be released from the sealing seat, does not yet detach from the sealing seat, but sticks to the same.

It is the object of the invention to create a sealing system and a solenoid valve which allow a safe switching when used in high-viscosity media.

SUMMARY

The invention provides a sealing system for a solenoid valve for accommodation in a recess in an actuating element movable by a coil, wherein the recess proceeds from an end face of the actuating element close to a valve seat and the actuating element is movably mounted in a solenoid valve and is designed for clearing or closing the valve seat, comprising a sealing disk and a spring element biasing the sealing disk, which is arranged on the end face facing away from the valve seat and centered with respect to the sealing disk and exerts a force on the sealing disk in direction of the valve seat, wherein the sealing disk is axially shiftably guided in the actuating element.

To reduce position tolerances in actuating direction, the sealing element is axially biased in direction of the valve seat with a spring which is accommodated inside the actuating element. Only when a certain lift-off force and a certain lift-off path are present, will the sealing element be lifted off from the valve seat. The sealing disk preferably has a multi-part design and comprises a preferably metallic seal holder and a sealing element, wherein the seal holder along with the sealing element is axially shiftably guided in the actuating element and holds the sealing element.

In the sealing system according to the invention, the sealing element made e.g. of an elastomeric material does not rub against the wall of the actuating element, when it is moved axially. Rather, a seal holder is present, which is made of a low-friction material, preferably of metal. In this way, the friction combinations can be optimized on the one hand, and on the other hand there is no more wear at the outer circumference of the sealing element. In addition, the outer circumference of the seal holder also always is constant, in contrast to the variable outer circumference of an elastic sealing element which is compressed differently. Gaps hence can be designed very small, which is advantageous for the use with high-viscosity oil.

The recess in the actuating element should be circularly cylindrical.

The seal holder can be designed substantially ring-shaped, in order to accommodate the sealing element.

According to the preferred embodiment, the seal holder has a radially outer circumferential surface which is adjacent to an inner side of the actuating element serving as sliding surface.

In addition, the seal holder has an inner surface which surrounds a circumferential edge of the sealing element, which however is the case only optionally. Alternatively, the sealing element also might axially be put onto the seal holder.

The seal holder preferably has a closed circumferential bead protruding to the inside, against which the sealing element can strike axially.

One embodiment provides that the inner surface adjoins this bead at its end close to the valve seat.

The sealing element can rest against a flat abutment surface at the bead and hence ensure a particularly tight connection to the seal holder.

At the end remote from the valve seat a protrusion radially protruding to the inside optionally is present at the seal holder, with which the sealing element is held in an axial direction, so that the sealing element is axially positioned, preferably axially clamped between holding protrusion and bead.

Bead and/or holding protrusion should be an integral part of the seal holder.

The holding protrusion can be formed by a thin, web-like wall of the seal holder, which is flanged around the edge of the sealing element.

To keep the contact between the sealing disk (or in the case of the multi-piece formation of the unit of seal holder and sealing element) and an axial stop at the actuating element as small as possible, the sealing disk (the seal holder) on the end face close to the valve seat has a preferably closed circumferential, narrow axial tab which alone is responsible for contacting in an end position of the valve. As an alternative, it can of course also be provided not to provide a closed circumferential tab, but individual tabs circumferentially spaced from each other, for example point-like tabs, in order to even further reduce the contact surface. With a reduced contact surface the adhesive force also is reduced, which is produced by oil between the parts. The size of the abutment surface of the tab is smaller than in a sealing disk formed with a continuous flat end face, i.e. the counter-abutment surface for the sealing disk is not contacted completely owing to the tab.

The tab can be formed in that the tab is separated from the rest of the end face by a circumferential groove extending all around.

In addition, for reducing the circumferential contact surface between sealing disk and inner surface of the recess in the actuating element the sealing disk is provided with at least one recess, in particular chamfer, on its circumferential edge, which is so high that the contact surface is reduced by at least 25% as compared with a sealing disk which has two continuously flat end faces.

A simplified manufacture and a compact construction of the seal holder is provided by an embodiment in which the tab axially ends in a plane in which the abutment surface of the bead for the sealing element is located.

It must be ensured that even in the case of an actuation of the valve over several years the sealing element always fully rests against the sealing seat and is not loaded unequally or is plastically deformed in the course of time. For this purpose, one or more metallic washers and the spring element for biasing the sealing disk (the sealing element) in direction of the valve seat are provided on the end face of the sealing disk (the sealing element) remote from the valve seat. The washer is present between spring element and sealing disk (sealing element), so that the spring element does not directly press onto the sealing disk (the sealing element) and produce a permanent deformation.

A first washer fully rests against the sealing disk, i.e. ensures a uniform introduction of force. A second washer with a central bulge rests against the first washer and provides a point contact in the center of the sealing disk (the sealing element).

When the sealing system in addition also is slightly radially mounted with clearance, a kind of floating bearing is obtained, in which a minimal tilting of the unit of sealing disk or seal holder and sealing element as well as washer about the contact point caused by the bulge can be effected. There is obtained a kind of ball head bearing which allows the sealing element to adapt to the plane defined by the sealing seat.

When the sealing disk is designed in one piece, it in particular is made of PTFE, PCTFE or PEEK.

The solenoid valve according to the invention comprises an actuating element which is moved by a coil, in order to selectively open and close a valve seat. On the end face close to the valve seat the actuating element has a recess in which the sealing system of the invention is axially movably accommodated.

One embodiment of the invention provides that in the recess a retaining ring is attached to the actuating element, which defines an end position of the sealing disk. The sealing disk like the entire sealing system thus is axially pushed into the recess and prevented from falling out by the subsequently inserted retaining ring.

The retaining ring should be dimensioned such that in an end position (open position) the seal holder supports on the retaining ring with an axial tab.

Alternatively or in addition, in this end position the bead can immerse into a space surrounded by the retaining ring, in order to create a space-saving construction.

The recess in the actuating element preferably has two portions merging into each other with different diameters. This allows designing of the recess as small as possible.

A first portion of the recess remote from the end face of the actuating element has a smaller diameter than the adjoining portion located closer to the valve seat. The first portion is formed as receiving space for a spring element, in the second portion sealing disk (or seal holder and sealing element), retaining ring and possibly washers or the washer can be accommodated.

Transverse bores which end in the recess in the actuating element allow an inflow or outflow of the medium during the movement of the sealing system in the recess, wherein preferably a transverse bore opens into each of the two portions of the recess.

The actuating element can be formed as magnet core, rocker or hinged armature.

BRIEF DESCRIPTION OF THE DRAWINGS

FIG. 2 shows an enlarged sectional view through the solenoid valve according to the invention in the region of the sealing system of the invention with closed valve seat, FIG. 3 shows a detail view enlarged corresponding to FIG. 2 of the sealing system according to the invention with open valve seat.

DETAILED DESCRIPTION

Figure 1:
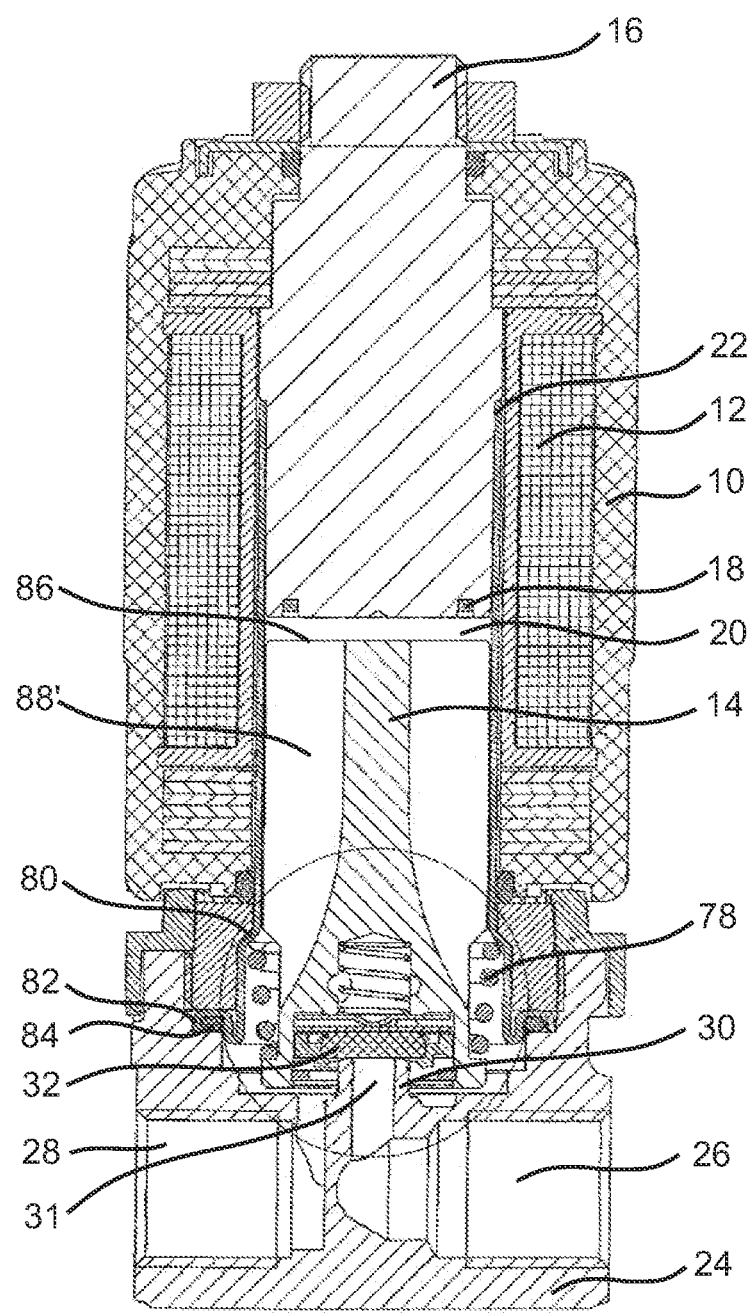
FIG. 1 shows a longitudinal sectional view through a solenoid valve according to the invention for an oil burner.

FIG. 1 shows a solenoid valve which is traversed by high-viscosity oil and is used for dosing oil in oil burners.

The solenoid valve comprises a housing 10 with an electric coil 12 for moving an actuating element 14, which in the present case is formed as magnet core. In the following, however, the magnet core always will be referred to as actuating element for simplification. Via the coil 12, the actuating element 14 can be moved in axial direction.

In the interior of the housing 10 a cavity is provided, which in part also is surrounded by the coil 12 and which in an axial direction is closed by a plug 16 of ferromagnetic material. When the solenoid valve is operated with alternating voltage, an AC voltage ring 18 made of copper or silver is accommodated in the end face of the plug 16.

The actuating element 14 is seated in a so-called valve space which in part is filled by the actuating element 14, but which in the closed position of the solenoid valve as shown in FIG. 1 comprises a gap 20 between the plug 16 and the actuating element 14.

A so-called core guiding tube 22 is provided on the inside of the housing 10 and lines the valve space radially to the outside. The guiding tube 22 serves as sliding guide surface for the actuating element 14 sliding along the same.

The oil flows through a valve body 24 on which the housing 10 also is seated. The valve body has a first opening 26 and a second opening 28, between which a connecting passage with a valve seat 30 is provided, which with a closed valve closes the connecting passage and with an open valve clears the valve seat 30 and hence opens the connecting passage. The valve seat 30 is a ring-shaped surface, preferably a freely ending wall with a through opening 31 surrounded by the valve seat 30 as part of the connecting passage. A sealing element 32 can sit on the valve seat 30 and seal the valve seat 30.

The sealing element 32 is made of an elastomeric material, in particular however of PTFE, PCTFE or PEEK.

The sealing element 32 is part of a sealing system which in FIGS. 2 and 3 is shown more clearly and which comprises a seal holder 34, a first washer 36, a second washer 38 and a spring element 40, all of which are accommodated in a recess 42 in the actuating element 14. The recess 42 proceeds from an end face 44 of the actuating element 14 close to the valve seat 30 and is designed as blind hole.

The seal holder 34 and the sealing element 32 form a pre-mounted unit and a sealing disk.

The recess 42 has a first portion 46, which is remote from the end face 44 and has a small diameter, and a second portion 48 which adjoins the first portion 46 towards the end face 44 and has a larger diameter.

The two portions 46, 48 merge into each other.

In the first portion the spring element 40 is accommodated, so that this portion serves as receiving space for the spring element 40.

In the second portion 48 the seal holder 34, the sealing element 32 and the two washers 36, 38 are accommodated.

To prevent the sealing system from axially moving out of the recess 42, a retaining ring 50 is provided in the region of the recess 42, which at the same time serves as axial stop for the axially movable seal holder 34.

As shown in FIG. 2, the seal holder 34 is formed as ring which slides in the circularly cylindrical recess 42. The seal holder 34 for this purpose has a radially outer circumferential surface 52 which rests against and slides along an inner side of the actuating element 14 serving as sliding surface in the region of the portion 48.

On its inside, the ring-shaped seal holder 34 has an inner surface 54 which preferably sealingly rests against the circumferential edge of the sealing element 32 and surrounds the sealing element 32.

At its end close to the valve seat 30, the inner surface 54 ends at a preferably closed circumferential bead 56 radially protruding to the inside. The bead 56 is an integral part of the seal holder 34 and has a preferably flat abutment surface 58 for the axial abutment of the sealing element 32.

The sealing element 32 is clamped between the bead 56 and a holding protrusion 60 of the seal holder 34 radially protruding to the inside. The holding protrusion 60 is formed by a thin, web-like wall of the seal holder 34, which is flanged around the edge of the sealing element 32, so that an axial clamping is obtained.

On the end face close to the valve seat 30, the seal holder 34 has a preferably closed circumferential, axially protruding tab 62, which is extremely narrow and which, as shown in FIG. 3, rests against the retaining ring 50 in the open position of the valve. Thus, the tab 62 serves as abutment surface in the so-called second end position (opening position) of the valve. The tab 62 ends in a radial plane in which the abutment surface 58 of the bead 56 also is located.

On the end face of the sealing element 32 remote from the sealing seat 30 a first washer 64 (see FIG. 3) fully rests.

On the back of the first washer 64 in turn a second washer 66 rests, preferably only with a point contact in essence, since the second washer 66 has a central bulge 68. This bulge ensures that there is a centric introduction of force by the spring element 40, which provides for a uniform shifting of the sealing system. The first washer 64 ensures a uniform introduction of force into the sealing element 32 and prevents the sealing element 32 from being deformed on its back by the spring force 40 during its use.

The spring element 40, as mentioned already, biases the sealing element, more exactly the rest of the sealing system, in direction of the valve seat 30.

As shown in FIGS. 2 and 3, the valve seat 30 is formed such that in the closed condition of the valve it can be closed by the sealing element 32, wherein the seal holder 34 radially surrounds the valve seat 30 with a distance, so that only the sealing element 32 rests against the valve seat 30.

The seal holder 34 and/or one or both of the washers 64, 66 preferably are made of metal.

The radial layers of the bead 56 and the retaining ring 50 are adjusted to each other such that independent of the position of the valve the bead 56 does not get in contact with the retaining ring 50, but in the open condition (see FIG. 3) immerses into the cavity surrounded by the retaining ring 50 and rests against the retaining ring 50 only with the axial tab 62.

Figure 4:
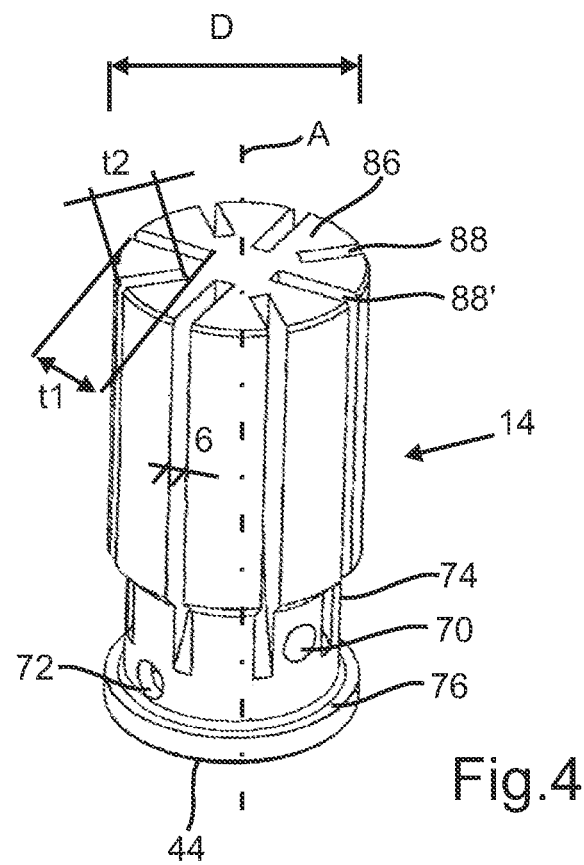
FIG. 4 shows a perspective view of the magnet core according to the invention as used in the solenoid valve according to the invention.
Figure 5:
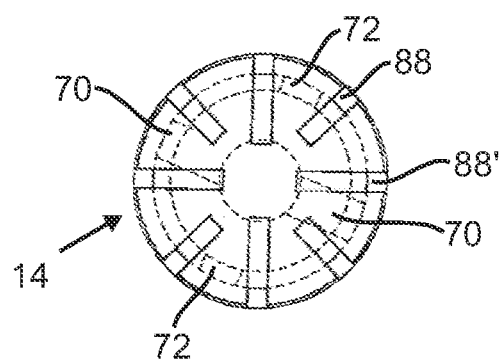
FIG. 5 shows a top view of the magnet core as shown in FIG. 4.

The actuating element 14, as can also be seen in FIG. 4, preferably has two radial transverse bores 70, 72 which are axially and preferably in addition also circumferentially spaced from each other and in the present case are designed as through bore. The transverse bore 70, which is also shown in FIGS. 2 and 3, opens into the portion 46 of the recess 42 and the transverse bore 72 in the portion 48.

Preferably, the transverse bore 72 is located such that it always is open towards the receptacle 42 also on the back of the sealing element 32.

Close to its end face 44 opposite the valve seat, the actuating element 14 has a circumferential constriction 74 which ends in a shoulder 76 and which serves the accommodation of a spring 78 (see FIG. 1). The spring on the one hand supports on the shoulder 76 and on the other hand on a shoulder 80 which is formed by an expansion of the tube 22.

The tube 22 is expanded towards the valve seat 30 and ends in a flange wall 82 repeatedly bent into a U-shape (see FIG. 1), wherein inside a "U" a seal 84 is accommodated towards the valve body 24.

Beside the end face 44, which is referred to as first end face, the actuating element 14, here the magnet core, possesses an opposite second end face 86.

From the second end face 86, a plurality of preferably radially extending grooves 88, 88' are provided in the actuating element 14, which extend along the middle axis A of the substantially circularly cylindrical actuating element 14.

The grooves 88, 88' however do not reach the second end face 44 and end before the same, in particular in the region of the constriction 74.

The grooves 88, 88' form longitudinal grooves whose depth T corresponds to at least 25% of the diameter D of the actuating element 14, wherein this diameter D and the depth are measured in the region of the coil 12.

There are provided longitudinal grooves with different depths, namely longitudinal grooves 88 with a groove depth t2 which is smaller than the groove depth t1 of the grooves 88'. The grooves 88' are referred to as first longitudinal grooves and the grooves 88 as second longitudinal grooves. Both grooves 88 and 88' axially extend preferably to equal lengths and both begin at the second end face 86.

The groove depth t2 also is at least 25% of the magnet core diameter D.

The first and second longitudinal grooves 88, 88' each alternate in circumferential direction, wherein it would also be possible, however, to provide for example two or more adjacent first longitudinal grooves 88' and a second longitudinal groove 88 between groups of first longitudinal grooves 88'.

The groove width b preferably is the same for the two longitudinal grooves 88, 88' and in addition preferably amounts to not more than 10% of the diameter D.

In the illustrated exemplary embodiment the diameter D is 19 mm, and there are provided four longitudinal grooves 88 and four longitudinal grooves 88' in alternation. The depth of the longitudinal grooves on the one hand is 5 mm and on the other hand 6.75 mm, the groove width merely is 1.5 mm.

Due to the high number of the grooves 88, 88' with high depth, an effective reduction of detrimental turbulent flows can be achieved.

The location of the spring 78 in the region of the constriction 74 ensures that very little material must be removed from the actuating element 14, in order to serve for accommodating the spring 78. Previous embodiments have provided recesses for accommodating the spring 78 in the region of the second end face 86, which however have led to a great reduction of the magnetic force.

As shown in FIGS. 1 to 3, the depth of the longitudinal grooves 88', and also of the longitudinal grooves 88, decreases in direction towards the second end face 44 and shallows out so to speak in the region of the constriction 74.

The solenoid valve according to the invention and the sealing system have some decisive advantages.

On the one hand, the elastic sealing element 32 does not rub against the inside of the recess 42 and hence is not subject to severe wear. Due to the material combination metal/metal between seal holder 34 and actuating element 14 the friction also is reduced.

Furthermore, the very small abutment surfaces between the seal holder 34 and the retaining ring 50 serve to prevent sticking of the sealing system, when the same is used after an extended standstill, as in this region viscous oil is present due to the absence of media separation. Moreover, a circumferential protruding tab 90 on the end wall between first and second portion 46, 48 of the receptacle 42 also serves this purpose, as the tab 90 serves as stop for the washer 38 (see FIG. 3).

When a radial gap in addition is present between the seal holder and the inside of the recess 32, a kind of floating bearing of the sealing system in the actuating element 14 even can occur.

Since the sealing system is axially shiftably accommodated in the actuating element 14, the medium present in the recess 42 must be able to flow into and out of the recess 42 on the back of the sealing element 32, which is made possible by the transverse bores 70, 72. Thus, the recess 42 always is filled with oil, and also the regions between the washers 64, 66.

In the following, the mode of operation of the solenoid valve will be explained.

In the starting position, when the coil 12 is not current-carrying, the spring 78 urges the actuating element 14 in direction of the valve seat 30, so that the sealing element 32 sealingly rests against the valve seat 30.

Tolerances in longitudinal direction are compensated by the spring element 40, which provides an additional pressing force.

When the coil subsequently becomes current-carrying for opening the valve, the coil 12 attracts the magnet core, here the actuating element 14. The actuating element 14 first is slightly moved upwards, wherein during this starting movement the spring element 40 still holds the sealing element 32 at the sealing seat 30. Only when the seal holder 34 rests against the retaining ring 50, which in this case serves as stop, will the sealing element 32 lift off from the sealing seat 30 (see FIG. 3). Medium then can flow through the through opening 31 and the connecting passage, so that the openings 26, 28 are in flow connection with each other.

To permit the movement of the actuating element 14 into the coil, the medium, here the viscous oil which is present between the end face 86 and the plug 16, must be displaced. This displacement of the oil is effected via the longitudinal grooves 88, 88', so that the oil flows in direction towards the end face 44, in the region of the expansion of the tube 22, where a transition to an annular space 100 (FIG. 3) is present, so to speak, which is located radially outside the valve seat 30 and which in the open condition is in flow connection with the through opening 31.

When the sealing element 32 is moved downwards inside the actuating element 14 relative to the same (i.e. from the closed condition into the open condition), oil is sucked into the recess 72 via the transverse bores 70 due to this movement.

When the actuating element 14 is moved into the closed condition, oil is delivered back into the gap 20 via the longitudinal grooves 88, 88'.

Figure 6:
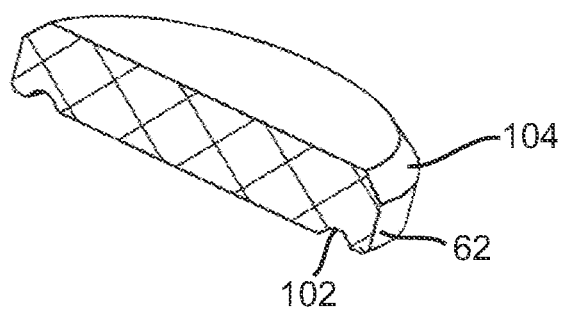
FIG. 6 shows a cross-sectional view through a one-piece embodiment of the sealing disk.

In the embodiment of FIG. 6, the sealing disk is formed in one piece and consists of PTFE, PCTFE or PEEK. The sealing disk originally has a cylindrical basic shape, but for reduction of the contact surfaces a circumferentially closed circumferential groove 102 and a recess in the form of a chamfer 104 provided at the outer circumference are provided, which decreases the circumferential contact surface in the recess by at least 25%. Due to the circumferential groove 102, the tab 62 serving as stop is cut off. Otherwise, however, the sealing disk can form an alternative for the unit of seal holder and sealing element, so that reference can be made to the remaining drawings.

Even if in the present Figures the actuating element is designed as magnet core, the advantages of the invention, in particular of the sealing system, also can be realized in a rocker or a hinged armature. In this case, the sealing system is accommodated in a corresponding recess in the rocker or in the hinged armature.

The invention claimed is:

1. A sealing system for a solenoid valve for accommodation in a recess in an actuating element movable by a coil, wherein the recess proceeds from an end face of the actuating element close to a valve seat and the actuating element is movably mounted in the solenoid valve and is adapted to clear or close the valve seat, the sealing system comprising a sealing disk and a spring element biasing the sealing disk, the spring element being arranged on an end face of the sealing disk facing away from the valve seat and being centered with respect to the sealing disk and exerting a force on the sealing disk in a direction towards the valve seat, wherein the sealing disk is axially shiftably guided in the actuating element, wherein the sealing system comprises a substantially ring-shaped seal holder which is axially shiftably guided in the actuating element, which accommodates a sealing element in the actuating element's interior and holds the sealing element, wherein the seal holder and the sealing element are a prefabricated unit and together form the sealing disk, wherein the ring-shaped seal holder has at least one radially outer circumferential surface adjacent to an inside of the actuating element serving as a sliding surface, and wherein the seal holder and the sealing element are both completely housed within the recess of the actuating element.

2. The sealing system for a solenoid valve according to claim 1, wherein the seal holder has at least one of a radially outer circumferential surface, which is adjacent to an inside of the actuating element serving as a sliding surface, and an inner surface which surrounds a circumferential edge of the sealing element.

3. The sealing system for a solenoid valve according to claim 2, wherein at an end remote from the valve seat the seal holder has a holding protrusion radially protruding to the inside, with which the sealing element is held in an axial direction.

4. The sealing system for a solenoid valve according to claim 2, wherein at the inner surface's end close to the valve seat the inner surface adjoins a circumferential bead of the seal holder radially protruding to the inside.

5. The sealing system for a solenoid valve according to claim 4, wherein a flat abutment surface for the sealing element is formed at the bead.

6. A sealing system for a solenoid valve for accommodation in a recess in an actuating element movable by a coil, wherein the recess proceeds from an end face of the actuating element close to a valve seat and the actuating element is movably mounted in the solenoid valve and is adapted to clear or close the valve seat, the sealing system comprising a sealing disk and a spring element biasing the sealing disk, the spring element being arranged on an end face of the sealing disk facing away from the valve seat and being centered with respect to the sealing disk and exerting a force on the sealing disk in a direction towards the valve seat, wherein the sealing disk is axially shiftably guided in the actuating element, wherein on the sealing disk's end face close to the valve seat the sealing disk has a circumferentially closed, axial tab serving, in a first end position of the axially shiftable sealing disk in which the solenoid valve is open, as the only abutment surface of the sealing disk contacting an axial stop provided at the actuating element.

7. A sealing system for a solenoid valve for accommodation in a recess in an actuating element movable by a coil, wherein the recess proceeds from an end face of the actuating element close to a valve seat and the actuating element is movably mounted in the solenoid valve and is adapted to clear or close the valve seat, the sealing system comprising a sealing disk and a spring element biasing the sealing disk, the spring element being arranged on an end face of the sealing disk facing away from the valve seat and being centered with respect to the sealing disk and exerting a force on the sealing disk in a direction towards the valve seat, wherein the sealing disk is axially shiftably guided in the actuating element, wherein on the end face of the sealing disk remote from the valve seat, a first and a second washer and the spring element for biasing the sealing disk in direction towards the valve seat are provided, wherein the washers are located between the spring element and the sealing disk, wherein a first washer has an opposing surface opposing the sealing disk and rests against the sealing disk with the complete opposing surface and wherein a second washer has a central bulge resting against the first washer.

8. A solenoid valve with a coil and an actuating element which is moved by the coil, in order to selectively open and close a valve seat, wherein on an end face close to the valve seat the actuating element has a recess in which a sealing system is axially movably accommodated, the sealing system comprising a sealing disk and a spring element biasing the sealing disk, the spring element being arranged on an end face of the sealing disk facing away from the valve seat and being centered with respect to the sealing disk and exerting a force on the sealing disk in a direction towards the valve seat, wherein the sealing disk is axially shiftably guided in the actuating element, wherein the sealing disk comprises a substantially ring-shaped seal holder which is axially shiftably guided in the actuating element, which accommodates a sealing element in the actuating element's interior and holds the sealing element, wherein the seal holder and the sealing element are a prefabricated unit and together form the sealing disk, and wherein the ring-shaped seal holder has at least one radially outer circumferential surface adjacent to an inside of the actuating element serving as a sliding surface, and wherein the seal holder and the sealing element are both completely housed within the recess of the actuating element.

9. The solenoid valve according to claim 8, wherein in the recess a retaining ring is attached to the actuating element, the retaining ring defining an end position of the sealing disk.

10. The solenoid valve according to claim 9, wherein a second portion of the recess adjacent to the end face of the actuating element close to the valve seat defines a receiving space for the sealing disk and the retaining ring.

11. The solenoid valve according to claim 10, wherein the second portion accommodates at least one washer between sealing disk and spring element.

12. The solenoid valve according to claim 8, wherein the recess in the actuating element includes two portions merging into each other with different diameters.

13. The solenoid valve according to claim 12, wherein a first portion of the recess with smaller diameter remote from the end face of the actuating element close to the valve seat is formed as receiving space for a spring element.

14. The solenoid valve according to claim 12, wherein at least one radial transverse bore extending radial to the longitudinal axis of the actuating element is provided ending in the recess.

15. The solenoid valve according to claim 8, wherein the actuating element is formed as one of a magnet core, rocker or hinged armature.

* * * * *